United States Patent Office 3,375,922
Patented Apr. 2, 1968

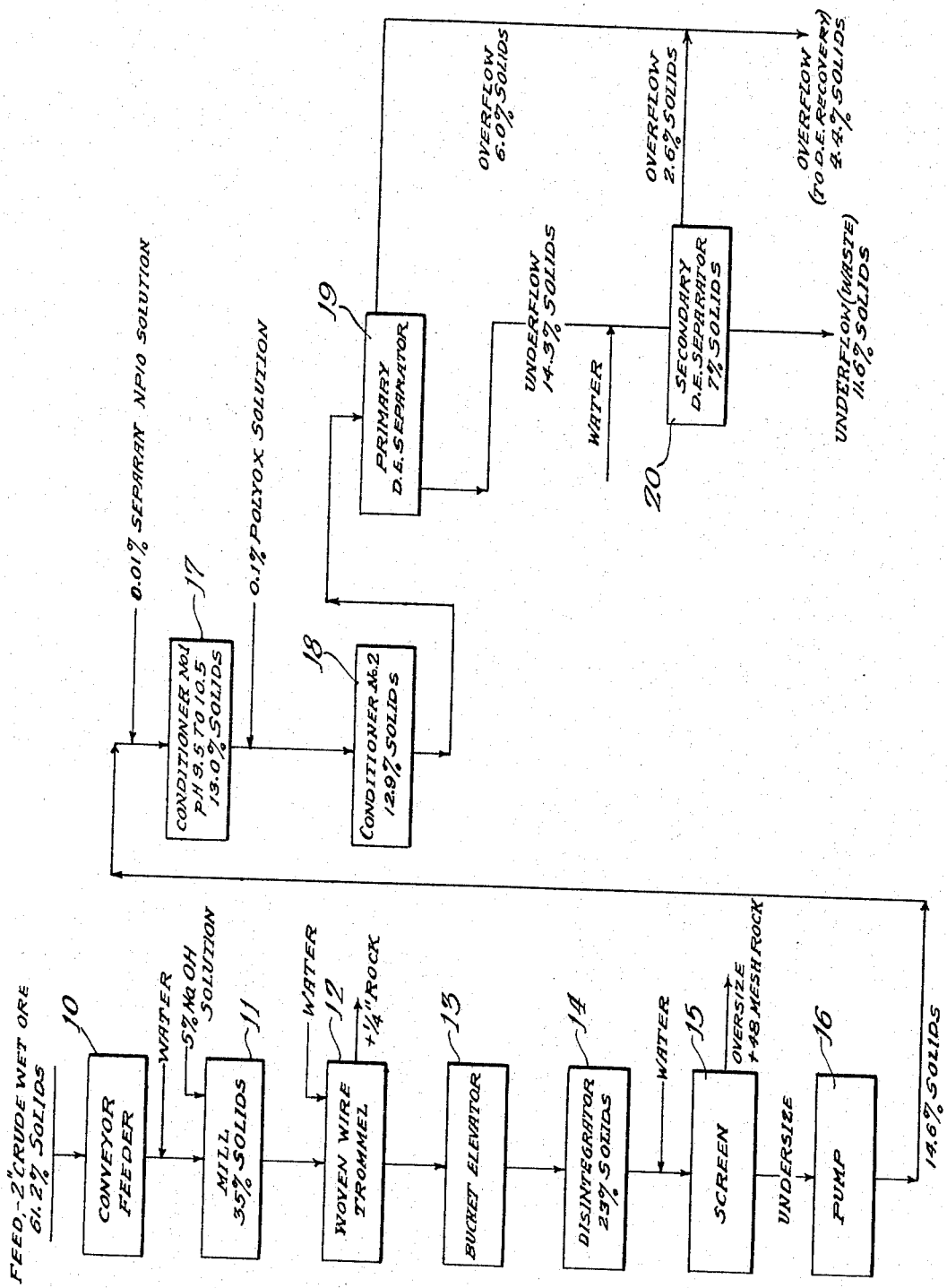

3,375,922
PROCESS FOR BENEFICIATING DIATOMACEOUS EARTH ORES
Carl C. Martin, Golden, Colo., and Don T. Goodhue, Lompoc, and Dorothy M. Rengel, Palos Verdes, Calif., assignors, by mesne assignments, to GREFCO, Inc., Philadelphia, Pa., a corporation of Pennsylvania
Filed Aug. 9, 1965, Ser. No. 478,296
12 Claims. (Cl. 209—5)

ABSTRACT OF THE DISCLOSURE

Crude diatomaceous earth is milled and suspended in water using an alkaline dispersing (deflocculating) agent (i.e. sodium hydroxide, TSPP, etc.) with pH adjusted to at least 7.6, preferably 9 to 11. Then the slurry (10 to 20% solids) is slowly agitated and the clay and other impurities are flocculated with small amounts of a water soluble, polymeric organic reagent in one or more stages. After settling and removing the flocculated clay and other suspended impurities, the suspended beneficiated diatom particles are recovered by adding lime or acid, preferably with additional flocculating reagent and after appropriate pH adjustment above 11 or below 5, to the suspension. Separation of the flocculated clay minerals and the beneficiated diatomite is accomplished in conventional thickening and separating devices or filters.

---

This invention relates to a method for beneficiating crude ores containing substantial quantities of diatomaceous earth in order to recover the diatom values. More particularly this invention relates to a process for beneficiating diatomaceous earth-containing ores which are contaminated with varieties of clay and other impurities, in order to upgrade such ores and render them suitable for processing into high quality diatomaceous filteraids.

Diatomaceous earth filteraids have been used for many years for removing finely divided and colloidal suspended particles from liquids. These filteraids are usually employed by admixing a small amount of the filteraid with the liquid to be filtered and thereafter passing the liquid through a septum (screen, cloth or other permeable support) on which the filteraid and entrained suspended particles are retained while the liquid passes through in a clarified condition. The filteraids can also be used on "precoat filters" on which the filteraid is deposited upon a filtration apparatus such as a rotary drum fitted with a screen or other septum maintained under vacuum. The liquid is passed through the precoat (with or without body feed of filteraid) and the undesirable suspended matter is retained on the precoat filteraid.

Diatomaceous earth has also been used in a variety of other industrial products including fillers, catalyst bases, paint additives, etc. An excellent comprehensive article on the properties, uses and manufacture of various diatomaceous earth products including filteraids appears in an article written by Hull et al., Industrial and Engineering Chemistry, February 1953, pages 256 to 269. Reference is also made to a comprehensive treatise on the subject by Robert Calvert, "Diatomaceous Earth" printed as an American Chemical Society Monograph by the Chemical Catalog Company in 1930.

It is now recognized that the proven reserves of high quality diatomaceous earth ore deposits are diminishing and methods must be found to utilize lower quality deposits. At the present time, the number of significant high quality diatomaceous earth deposits in the United States numbers fewer than six, the main deposits being located near Lompoc, Calif. Since the reserves of high grade deposits are limited and there are large deposits available low in purity, usually contaminated by clay and other minerals, it would be possible to greatly extend the reserves of diatomaceous earth crude materials in the United States if means could be found to upgrade such deposits.

It is an object of this invention to provide a process for upgrading marginal diatomaceous earth crude ore deposits containing significant quantities of clay and other impurities which render them unsuitable for direct processing into high quality diatomaceous earth filteraids.

It is a further object of this invention to provide a process whereby the clay and other impurities in crude diatomaceous earth ore deposits may be separated from the diatoms by commercially feasible methods to produce a product which can be directly processed by conventional, commercially recognized methods for producing diatomaceous earth filteraids.

In accordance with the present invention, a crude diatomaceous earth (D.E.) ore, preferably containing more than 50% of diatom particles with the balance consisting of various types of clays, opaline, sand, iron compounds and other impurities, is subjected to a wet or dry milling operation in which the earth is preliminarily crushed and screened, after which it is suspended or slurried in a considerable volume of water and agitated or otherwise dispersed therein. A dispersing agent such as tetrasodium pyrophosphate or sodium hydroxide, etc. is added. The pH of the well dispersed slurry is adjusted to at least 7.6, preferably within the range of 9 to 11, by means of a suitable alkaline agent such as sodium hydroxide, soda ash, etc. This step has been found to be a critical and essential feature of the present process. After the slurry has been agitated for a suitable time to obtain adequate dispersion of the diatomaceous earth particles, the clay particles and other impurities, a controlled amount of a dilute solution of a substantially water soluble, polymeric organic composition or reagent is added to the dispersion to flocculate most of the impurities. The slurry containing the flocculated clay particles (with some occluded diatom values) and other impurities is then pumped to a primary thickening and separating device wherein the flocculated particles settle and are removed from the bottom and the diatomaceous earth particles remain suspended in the aqueous phase. The diatomaceous earth particles are then recovered from this aqueous phase methods and by means to be subsequently described herein.

As previously stated, it is essential that the pH of the initial slurry or dispersion of the crude diatomaceous earth ore be adjusted to above 7.6 and preferably between about 9 and about 11, particularly when "hard" water must be used in the process. It has been found that selective separation by flocculation cannot be effectively and efficiently conducted while leaving the diatom particles deflocculated, at slurry pH values below 7.6. Economic considerations dictate that the pH of the slurry not be raised significantly higher than 11 because no particular advantage is to be gained by doing so. Furthermore, since one of the procedures for recovering the suspended diatomaceous earth particles from the aqueous phase involves the addition of additional acidic reagents to flocculate the diatomaceous earth particles, the use of excessive quantities of caustic or other alkaline reagents to raise the pH above 11 will require unnecessary amounts of additional reagents to flocculate the diatomaceous earth particles.

I have found that a large variety of water soluble organic polymeric compositions or reagents are suitable for flocculating the contaminating particles, including clay, while allowing diatomaceous earth particles to remain suspended in the aqueous phase of the slurry, provided, of course, that the pH of the slurry is adjusted as previously stated herein. Among the reagents which I have found to be suitable to flocculate the clay particles are the following:

(1) Water soluble cationic polyacrylamide polyelectrolytes manufactured by the Dow Chemical Company, Midland, Mich., and sold under the trade name Separan including specifically Separan NP-10 and Separan NP-20; the Aerofloc and Superfloc materials manufactured by American Cyanamid Company, New York, N.Y.; Poly hall 27 made by Stein Hall Company; the Reten compositions which are cationic, high molecular weight polyacrylamides made by Hercules Powder Company.

(2) Certain natural gums designated Jaguar 315 and 507 and Jaguar Plus made from guar seeds, and which are polysaccharides made by Stein Hall Co.

(3) Water soluble polymers of alkylene oxides containing from 2 to 4 carbon atoms, i.e. ethylene oxide, the propylene oxides (1,2-propylene oxide and trimethylene oxide), and the butylene oxides (isobutylene oxide, 1,2-epoxy butane and 2,3-epoxy butane), which are polymers having molecular weights from several thousand to about five million. A preferred reagent within the group is sold under general trade name Polyox manufactured by Union Carbide Chemicals Company and having a molecular weight in the range of several hundred thousand to five million.

The above reagents are introduced into the slurry of dispersed diatomaceous earth crude ore containing clay and other impurities, in relatively dilute amounts. Preferably a solution of these reagents is prepared in water in a concentration between 0.01 to 1.0% by weight.

The amount of reagent employed will depend upon the quantity of clay and other impurities present in the diatomaceous earth ore. It will also depend in part upon the temperature of the aqueous dispersion of diatomaceous earth crude, the particular pH of the slurry, and the percent solids in the slurry. In general however, between about 0.2 to 5 pounds of the reagent per ton of crude diatomaceous earth ore introduced into the process is adequate. More typically, from 0.2 to 1.0 pound of reagent per ton of crude material will adequately flocculate most of the clay particles and significantly upgrade the ore.

After the clay particles and other impurities have been flocculated, as described above, and removed from the aqueous dispersion, the diatomaceous earth particles may be recovered by several processes. One of these involves the addition of lime or equivalent (with or without a flocculating agent) to the dispersion, usually in amounts of 6 pounds per ton of lime (and 0.75 pound of reagent, if used) per ton of original crude fed to the process, followed by continuous, slow agitation of the slurry. If necessary, the pH is adjusted to a value from 9 to 11. The diatomaceous earth particles will settle and the aqueous phase can be removed by decanting, the use of a thickener, or this slurry may be passed through a suitable filter apparatus or other means may be employed to remove sufficient water from the diatomaceous earth particles to reduce the moisture content of the product to about 60 to 75%.

Another means for recovering the diatomaceous earth particles from the above described aqueous slurry is to add additional flocculating agent of the type previously described, after adjusting the pH of the slurry to below 5 and preferably between 1 to 4. It has been found that the diatomaceous earth particles will agglomerate rapidly in an acid medium.

Whether the diatomaceous earth particles are recovered from an alkaline or acid medium, this recovery can be accelerated by the use of flocculating agents of the type previously described herein. In a preferred embodiment of the invention, the Polyox reagent is used after having acidified the diatomaceous earth slurry to a pH of around 2.7 or raised its pH to 12.5 to 13. It has been found that 0.3 to 0.5 pound of this reagent per ton of dispersed diatomaceous earth particles is all that is required to flocculate the diatomaceous earth particles which can then be recovered in a thickening device, or on a filter.

The accompanying drawing illustrates the operation of a preferred embodiment of the process of the invention as applied, by way of specific example, to the processing of a strata of crude diatomaceous earth ore taken from a deposit near Lompoc, Calif. This ore contains from 15 to 25% clay, iron compounds and other impurities which render it unsuitable as "direct belt feed" to a conventional process. Thus, it is not suitable, as mined, for the manufacture of high quality diatomaceous earth filteraids in the process described in the article by Hull et al. in Industrial and Engineering Chemistry, February 1955, pages 256–269.

The diatomaceous earth crude was roughly screened to give a −2" material containing 61.2% solids and 38.8% moisture. This feed material was placed on a conveyor 10 and transferred to a mill 11 with sufficient water being added and 5% sodium hydroxide solution to give a slurry in the mill of 35% solids. Any suitable milling devices might be used such as a blade mill. The mill discharge was then passed over the woven wire trommel 12 which is washed with water. The +¼" material from this unit was rejected. From the trommel, the slurry was conveyed by an elevator 13 to a disintegrator 14 with sufficient water being added so that the slurry will have a solids content of about 23%. Depending upon the type of ore, this unit is occasionally omitted. In other words, if the crude material is readily disintegrated it may be possible to eliminate the disintegrator 14 from the circuit. The slurry was then passed over a screen 15 which is washed with water and the +48 mesh material was rejected. The undersize from the screen was conveyed by a pump 16 to the first conditioning unit 17, sufficient water being added either at the pump or downstream therefrom so that the solids content of the slurry in the conditioner 17 is about 13% by weight. To the conditioner, preferably at several points, was added a freshly made solution of Separan NP-10 (0.01% concentration) in an amount of about 0.2 pound of reagent per ton of feed material. If the pH of the slurry entering the conditioner 17 is not within the preferred range of 9.5 to 10.5, sufficient caustic is added to the slurry before reagent addition. The slurry in conditioner 17 was stirred slowly to produce an initial floc. Preferably the floc-containing slurry was then pumped into a second conditioner 18, together with a 0.1% concentration of Polyox solution employing about 0.2 lb. of this reagent per ton of feed material. The floc which forms in conditioner No. 2 was stirred slowly after which the floc-containing slurry was conveyed to a primary diatomaceous earth separator 19. The overflow from this separator, at the solids content of about 6.0%, was conveyed to the D.E. recovery station to be recovered by any of the methods disclosed herein. The underflow from the D.E. separator 19 at a solids content of 14.3% was conveyed to a secondary D.E. separator 20, sufficient water being added to produce a solids content of about 7% in the secondary separator 20. The overflow from the secondary separator 20, containing about 2.6% solids, was combined with the overflow from the primary separator 19 for D.E. recovery. The underflow from the secondary separator 20, having a solids content of 11.6% is rejected to waste.

The diatomaceous earth product recovered from the foregoing operation was dried, milled in a Gruendler mill and mixed with 6½% by weight of soda ash. This mixture was calcined at 1600° F. for 50 minutes and then milled slightly to break up the agglomerates. This product had a flow rate of 91, cake density of 16.9, brightness of 85 and 26.6% +30 microns. The raw material values were respectively 92; 21; 64 and 41.

In order to achieve optimum results, the following conditions should be observed during the operation:

(1) Agitation of the flocculant solutions and the pump in the No. 1 and No. 2 conditioners should be gentle, to avoid breaking up the flocs.

(2) Mixing of the flocculant solutions should also be done gently in order to avoid shearing action which appears to cause depolymerization.

(3) The solution should be made up at a strength not greater than 1.0% and then diluted as required. Reagent solutions above 1.0% become difficult to handle because of high viscosity.

(4) The Separan solution should be used at a concentration of 0.01 to 0.05% as it is added to the process stream. Also it should be added at a plurality of stations in the conditioner to achieve maximum results.

The percent of crude diatomaceous earth ore solids in the initial slurry to achieve good dispersion of the ore prior to the initiation of the process is not extremely critical but it is preferred to maintain the level of solids in the slurry at a value below 20%, and preferably within the range of 8 to 12%. It has been found that the selectivity of the flocculating reagents is enhanced and separation of the clay particles and other impurities from the diatomaceous earth is achieved in a more economical manner with respect to reagent cost if the slurry solids concentrations are maintained within the stated limits.

It has also been found that the concentration of the flocculating reagent in the solution which is to be added to the dispersion of the crude diatomaceous earth ore particles should usually be maintained within the range of 0.01 to 0.1% by weight but with some reagents, the concentration can be reduced to 0.005%. Adequate mixing time after addition of reagents to the dispersion of the diatomaceous earth particles should be used to insure efficient utilization of the reagent.

It has also been found that the use of a particular sequence of the reagents is surprisingly efficient in removing the clay particle impurities from the dispersion of diatomaceous earth ore particles. For example, and in a preferred embodiment of the invention, it has been found that additions of Separan NP-10 reagent followed by Polyox reagent, in a ratio of between about 0.5 to 1.0 and about 1:1 provides efficient flocculation and the resulting clay-containing precipitate can be rapidly and efficiently removed from the dispersion while diatomaceous earth particles remain well dispersed in the aqueous phase.

In the following examples, an indication of the efficiency of the process in removing clay, iron compounds and other impurities which would contaminate the diatomaceous earth particles and prevent utilization as a filteraid, is measured by calcining the crude material put into the process and the diatomaceous earth product produced as a final product at a temperature between 1600 and 1800° F. with from 6 to 7% by weight of sodium carbonate. The calcined product is then tested for "Brightness" (Br.) which measures the reflectance of the surface of the product expressed in percent of a standard (MgO) assigned a value of 100, measured on a Photovolt Reflection Meter, Model 610 (green filter), calibrated against a General Electric meter. The standard product has a brightness of 85 and this is considered to be adequate for "feed belt" quality diatomaceous earth material. Brightness values below this figure indicate progressively poorer "feed belt" quality raw material to a conventional diatomaceous earth filteraid manufacturing operation; and brightness values higher than 85 indicate progressively improved "feed belt" quality product.

Another indication of the suitability of the product produced by the process of this invention is the cake density (C.D.) of the material. This is obtained by milling the flux calcined product, suspending it in water and then re-recovering the diatomaceous earth filteraid particles on a vacuum filter and measuring the density of the cake in pounds per cu. ft. In general, cake densities higher than 19 pounds per cu. ft. are unsuitable as high quality ditomaceous earth filteraid products. Products having cake density values below 19 are deemed suitable and acceptable by industrial users of high quality diatomaceous earth filteraid products.

In the following table, three examples of the invention are illustrated employing three different types of crude. The flow rates (F.R.) of the feed material and the product, in each instance, were tested in a filtration of a standard 60° Brix aqueous solution of raw sugar at 80° C. To samples of this liquid were added 0.3% of filteraid (based upon the solids content of the sugar solution). The resulting slurry was passed through a ¾-inch diameter filter over a 21-minute cycle with a constant pressure of 20 pounds per square inch with the results indicated in the table. For comparative purposes, a standard quality diatomaceous earth filteraid is used with an assigned value of 100.

One indication of the effectiveness of the process is the elimination of coarse material in the flocculated product. This is shown in the following table as "+30 microns" material.

In the following examples, the crude material in each instance was blunged or beaten with a shearing action in a slurry of water at anywhere from 10 to 20% solids until a good dispersion was obtained. To achieve good dispersion and to adjust the pH of the dispersion to about 9.5 to 10.5, from 0.5 to 10 pounds by weight of caustic, tetrasodium pyrophosphate or equivalent alkaline dispersing agents were added. The slurry was screened to remove +48 mesh particles and the screen underflow was adjusted by means of additional water to about 10% solids. The slurry was then passed to a first conditioning unit to which a 0.01% aqueous solution of Separan NP-10 was added to the slurry as it was being mixed slowly to avoid any shearing action. This caused a fine flocculation of clay particles and other impurities. The resulting suspension was then passed to a second conditioning unit into which a 0.1% concentrated solution of Polyox was added. This resulted in a more complete flocculation of the previously flocculated clay particles and other impurities. In this process, 0.2 pound of Separan NP-10 and 0.2 pound of Polyox, based on each ton of feed, was used.

The slurry containing the flocculated solids was then passed into a primary separator from which the flocculated material was withdrawn at the bottom into a slurry classifier-thickener (separator). The overflow from the primary separator was sent to D.D. product recovery, as was the overflow from the slurry classifier-thickener (separator).

The suspended diatomaceous earth particles were recovered as a wet cake containing about 70% by weight of water by adjusting the suspension of diatomaceous earth particles to a pH value of between 1 to 4 by addition of a mineral acid such as hydrochloric or sulphuric acids, followed by addition of Polyox flocculant, and filtration of the slurry. Alternatively, sedimentation techniques can be used, but this is a much slower operation. After drying, the products were calcined with a 6½% soda ash at a temperature 1600 to 1800° F. and the agglomerated product was milled slightly and then determinations were made as to the flow rate, cake density, brightness, and 30 micron properties which appear in the following Table I.

TABLE I

|  | Example No. | F.R. | C.D. | Br. | +30μ |
|---|---|---|---|---|---|
| D.E. Crude No. 1: |  |  |  |  |  |
| Feed | 1 | 92 | 21 | 64 | 41 |
| Product |  | 112 | 15 | 90 | 22 |
| D.E. Crude No. 2: |  |  |  |  |  |
| Feed | 2 | 99 | 22 | 63 | 35 |
| Product |  | 134 | 16 | 91 | 28 |
| D.E. Crude No. 3: |  |  |  |  |  |
| Feed | 3 | 164 | 25 | 65 | 46 |
| Product |  | 115 | 18 | 86 | 29 |

It will be seen from the foregoing data that in all cases the cake density values of the products were significantly reduced as compared to the values for the feed material. It is essential that the cake density values be equal to or less than 19 to produce a satisfactory high quality diatomaceous earth filteraid product. Also the foregoing data show that in each case the brightness (Br.) values were significantly improved as compared to the feed material. In all cases the brightness value exceeded the minimum standard of 85. The foregoing data also indicate that a significant amount of reduction in the +30 micron particles was obtained by the flocculation and diatomite recovery process.

We claim:

1. A process for recovering the diatomite values from a crude diatomaceous earth containing clay and other impurities which comprises:
   (1) forming a dilute aqueous dispersion of said ore;
   (2) adjusting the pH of said dispersion to at least 7.6;
   (3) treating said dispersion with a substantially water soluble organic polymeric composition which will flocculate the clay particles and other impurities;
   (4) settling the flocculated clay particles and other impurities and separating them from the suspension of diatomaceous earth particles;
   (5) and recovering the diatomaceous earth particles from said suspension.

2. A process for recovering the diatomite values from a crude diatomaceous earth ore containing clay and other impurities which comprises:
   (1) forming a dilute aqueous dispersion of said ore;
   (2) adjusting the pH of said dispersion to between about 9 to 11;
   (3) adding to said dispersion a substantially water soluble organic polymeric composition which will flocculate the clay particles and other impurities;
   (4) settling the flocculated clay particles and other impurities and separating them from the suspension of diatomaceous earth particles;
   (5) and recovering the diatomaceous earth particles from said suspension.

3. A process for recovering the diatomite values from a crude diatomaceous earth ore containing clay and other impurities which comprises:
   (1) forming a dilute aqueous dispersion of said ore;
   (2) adjusting the pH of said dispersion to between 9 to 11;
   (3) adding to said dispersion a water soluble selective flocculating reagent selected from the group consisting a cationic polyacrylamide, an anionic polymethacrylate, a polysaccharide, a high molecular weight polymer of an alkylene oxide containing 2 to 4 carbon atoms and a polyethylene glycol, and mixtures thereof which will flocculate the clay particles and other impurities;
   (4) settling the flocculated clay particles and other impurities and separating them from the suspension of diatomaceous earth particles;
   (5) and recovering the diatomaceous earth particles from said suspension.

4. A process for recovering the diatomite values from a crude diatomaceous earth ore containing clay and other impurities which comprises:
   (1) forming a dilute aqueous dispersion of said ore;
   (2) adjusting the pH of said dispersion to between 9 to 11;
   (3) adding to said dispersion a substantially water soluble organic polymeric composition which will flocculate the clay particles and other impurities;
   (4) settling the flocculated clay particles and other impurities and separating them from the suspension of diatomaceous earth particles;
   (5) adjusting the pH of the suspension of diatomaceous earth particles to a value of 10 to 13 or 1 to 4;
   (6) adding to the adjusted suspension of diatomaceous earth particles a substantially water soluble organic polymeric composition which will flocculate same,
   (7) and separating the flocculated diatomaceous earth particles and removing them from the suspension.

5. A process for recovering the diatomite values from a crude diatomaceous earth ore containing clay and other impurities which comprises:
   (1) forming a dilute aqueous dispersion of said ore;
   (2) adjusting the pH of said dispersion to between 9 to 11;
   (3) adding to said dispersion a substantially water soluble organic polymeric composition which will flocculate the clay and other impurities;
   (4) settling the flocculated clay particles and other impurities and separating them from the suspension of diatomaceous earth particles;
   (5) adjusting the pH of the suspension of diatomaceous earth particles to a value below 5.0;
   (6) adding to the suspended diatomaceous earth particles a substantially water soluble organic polymeric composition which will flocculate said particles;
   (7) and separating and recovering the flocculated diatomaceous earth particles from the liquid phase.

6. A process for recovering the diatomite values from a crude diatomaceous earth or containing clay and other impurities which comprises:
   (1) forming a dilute aqueous dispersion of said ore;
   (2) adjusting the pH of said dispersion to between 9 to 11;
   (3) adding to said dispersion a substantially water soluble organic polymeric composition which will flocculate the clay and other impurities;
   (4) settling the flocculated clay particles and other impurities and separating them from the suspension of diatomaceous earth particles;
   (5) adjusting the pH of the suspension of diatomaceous earth particles to a value between 9 and 11;
   (6) adding lime to the suspended diatomaceous earth particles to flocculate same;
   (7) and separating and recovering the flocculated diatomaceous earth particles from the liquid phase.

7. A process for recovering the diatomite values from a crude diatomaceous earth ore containing clay and other impurities which comprises:
   (1) forming a dilute aqueous dispersion of said ore;
   (2) adjusting the pH of said dispersion to between 9 to 11;
   (3) adding to said dispersion a water soluble selective flocculating reagent selected from the group consisting of a cationic polyacrylamide, an anionic polymethacrylate, a polysaccharide, a high molecular weight polymer of an alkylene oxide containing 2 to 4 carbon atoms and a polyethylene glycol, and mixtures thereof which will flocculate the clay particles and other impurities;
   (4) settling the flocculated clay particles and other impurities and separating them from the suspension of diatomaceous earth particles;
   (5) adjusting the pH of the suspension of diatomaceous earth particles to a value of between 1 to 4;
   (6) adding to the suspended diatomaceous earth particles a water soluble flocculating reagent selected from the group consisting of a polymer of ethylene oxide, propylene oxide and butylene oxide having a molecular weight between 2,000 to 5,000,000 in an amount sufficient to flocculate the diatomaceous earth particles;
   (7) and separating and recovering the flocculated diatomaceous earth particles from the liquid phase.

8. A process for recovering the diatomite values from a crude diatomaceous earth ore containing clay and other impurities which comprises:
   (1) forming an aqueous dispersion of said ore containing up to about 20% by weight of solids;
   (2) adjusting the pH of said dispersion to a value between 9 to 11;

(3) adding to said dispersion a substantially water soluble organic polymeric composition which will flocculate the clay particles and other impurities;
(4) settling the flocculated clay particles and other impurities and separating them from the suspension of diatomaceous earth particles;
(5) adjusting the pH of the suspension of diatomaceous earth particles to a value below 5.0;
(6) adding to the suspension of diatomaceous earth particles a water soluble polymer of an alkylene oxide selected from the group consisting of ethylene oxide, propylene oxide, butylene oxide and polyethylene glycols ranging in molecular weight from several thousand to about five million, in amounts sufficient to flocculate the diatomaceous earth particles;
(7) and separating and recovering the flocculated diatomaceous earth particles from the liquid phase.

9. A process according to claim 7 wherein the pH of the suspended diatomaceous earth particles, after removal of clay particles, is adjusted to a value between 1 to 4 prior to flocculation of the diatomaceous earth particles.

10. A process for recovering the diatomite values from a crude diatomaceous earth ore containing clay and other impurities which comprises:
(1) forming a dilute aqueous dispersion of said ore;
(2) adjusting the pH of said dispersion to between 9 to 11;
(3) adding to said dispersion a water soluble selective flocculating reagent selected from the group consisting of a cationic polyacrylamide, an anionic polymethacrylate, a polysaccharide, a high molecular weight polymer of an alkylene oxide containing 2 to 4 carbon atoms and a polyethylene glycol, and mixtures thereof which will flocculate the clay particles and other impurities;
(4) settling the flocculated clay particles and other impurities and separating them from the suspension of diatomaceous earth particles;
(5) adjusting the pH of the suspension of diatomaceous earth particles to a value of from 11 to 13;
(6) adding to the suspended diatomaceous earth particles a water soluble flocculating reagent selected from the group consisting of a polymer of ethylene oxide, propylene oxide and butylene oxide having a molecular weight between 2,000 to 5,000,000 in an amount sufficient to flocculate the diatomaceous earth particles;
(7) and separating and recovering the flocculated diatomaceous earth particles from the liquid phase.

11. A process for recovering the diatomite values from a crude diatomaceous earth ore containing clay and other impurities which comprises:
(1) forming an aqueous dispersion of said ore containing up to about 20% by weight of solids;
(2) adjusting the pH of said dispersion to a value between 9 to 11;
(3) adding to said dispersion a substantially water soluble organic polymeric composition which will flocculate the clay particles and other impurities;
(4) settling the flocculated clay particles and other impurities and separating them from the suspension of diatomaceous earth particles;
(5) adjusting the pH of the suspension of diatomaceous earth particles to a value below 5.0;
(6) adding to said dispersion a water soluble selective flocculating reagent selected from the group consisting of a cationic polyacrylamide, an anionic polymethacrylate, a polysaccharide, a high molecular weight polymer of an alkylene oxide containing 2 to 4 carbon atoms and a polyethylene glycol, and mixtures thereof which will flocculate the diatomaceous earth particles;
(7) and separating and recovering the flocculated diatomaceous earth particles from the liquid phase.

12. A process for recovering the diatomite values from a crude diatomaceous earth ore containing clay and other impurities which comprises:
(1) forming an aqueous dispersion of said ore containing up to about 20% by weight of solids;
(2) adjusting the pH of said dispersion to a value between 9 to 11;
(3) adding to said dispersion a substantially water soluble organic polymeric composition which will flocculate the clay particles and other impurities;
(4) settling the flocculated clay particles and other impurities and separating them from the suspension of diatomaceous earth particles;
(5) adjusting the pH of the suspension of diatomaceous earth particles to a value below 5.0;
(6) adding to said dispersion a water soluble selective flocculating reagent selected from the group consisting of a cationic polyacrylamide, an anionic polymethacrylate, a polysaccharide, a high molecular weight polymer of an alkylene oxide containing 2 to 4 carbon atoms and a polyethylene glycol, and mixtures thereof which will flocculate the diatomaceous earth particles;
(7) and separating and recovering the flocculated diatomaceous earth particles from the liquid phase.

References Cited
UNITED STATES PATENTS

| | | | |
|---|---|---|---|
| 1,438,588 | 12/1922 | Feldenheimer | 209—5 |
| 1,456,111 | 5/1923 | Acheson | 209—5 X |
| 1,606,281 | 11/1926 | Williams | 209—5 |
| 2,957,818 | 10/1960 | Fischer | 209—5 X |
| 2,981,630 | 4/1961 | Rowland | 209—5 X |
| 3,020,231 | 2/1962 | Colwell | 209—5 X |

HARRY B. THORNTON, *Primary Examiner.*

R. HALPER, *Assistant Examiner.*